United States Patent
Chang

(10) Patent No.: US 10,538,693 B2
(45) Date of Patent: Jan. 21, 2020

(54) STABILIZATION OF PETROLEUM SURFACTANTS FOR ENHANCING OIL RECOVERY

(71) Applicant: Saudi Arabian Oil Company, Dhahran (SA)

(72) Inventor: Yun Chang, Webster, NY (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/884,896

(22) Filed: Jan. 31, 2018

(65) Prior Publication Data

US 2018/0155611 A1 Jun. 7, 2018

Related U.S. Application Data

(62) Division of application No. 14/994,507, filed on Jan. 13, 2016, now Pat. No. 10,125,307.

(51) Int. Cl.
 C09K 8/584 (2006.01)
 C09K 8/588 (2006.01)

(52) U.S. Cl.
 CPC .............. *C09K 8/584* (2013.01); *C09K 8/588* (2013.01); *C09K 2208/10* (2013.01)

(58) Field of Classification Search
 None
 See application file for complete search history.

(56) References Cited

U.S. PATENT DOCUMENTS

| | | | |
|---|---|---|---|
| 3,335,794 A | 8/1967 | Bond | |
| 3,508,612 A | 4/1970 | Reisberg et al. | |
| 4,207,946 A | 6/1980 | Haltmar et al. | |
| 4,353,806 A | 10/1982 | Canter et al. | |
| 4,426,303 A | 1/1984 | Nuckels | |
| 5,069,936 A | 12/1991 | Yen | |
| 5,373,901 A | 12/1994 | Norman | |
| 5,591,700 A | 1/1997 | Harris et al. | |
| 6,225,262 B1 | 5/2001 | Irwin | |
| 6,302,209 B1 | 10/2001 | Thompson, Sr. et al. | |
| 8,403,044 B2 | 3/2013 | Hutchison | |
| 8,512,862 B2 | 8/2013 | Berkland | |
| 8,513,168 B2 | 8/2013 | Barnes | |
| 8,524,803 B2 | 9/2013 | Miyabayashi | |
| 8,664,166 B2 | 3/2014 | Raney | |
| 8,759,261 B2 | 6/2014 | Barnes | |
| 8,889,600 B2 | 11/2014 | Hutchison | |
| 8,940,668 B2 | 1/2015 | Barnes | |
| 9,102,862 B2 | 8/2015 | Raney | |
| 2004/0014607 A1 | 1/2004 | Sinclair et al. | |
| 2005/0167104 A1 | 8/2005 | Roddy | |
| 2008/0202744 A1 | 8/2008 | Crews et al. | |
| 2009/0192053 A1 | 7/2009 | Crews et al. | |
| 2009/0281003 A1 | 11/2009 | Shahin et al. | |
| 2009/0301731 A1 | 12/2009 | Mcdaniel et al. | |
| 2010/0267594 A1 | 10/2010 | Rana | |
| 2011/0214862 A1 | 9/2011 | Horton | |
| 2012/0160487 A1 | 6/2012 | Barnes | |
| 2013/0023450 A1 | 1/2013 | Kanj et al. | |
| 2013/0190543 A1 | 7/2013 | Barnes | |
| 2013/0199788 A1 | 8/2013 | Barnes | |
| 2013/0252855 A1* | 9/2013 | Weerasooriya | C09K 8/58 507/202 |
| 2013/0274149 A1 | 10/2013 | Lafitte | |
| 2013/0296201 A1 | 11/2013 | Barnes | |
| 2014/0005082 A1 | 1/2014 | Barnes | |
| 2014/0031265 A1 | 1/2014 | Chang | |
| 2014/0110305 A1 | 4/2014 | Barnes | |
| 2014/0220350 A1 | 8/2014 | Kim | |
| 2014/0224490 A1 | 8/2014 | Barnes | |
| 2014/0305649 A1 | 10/2014 | Tang | |
| 2015/0079162 A1 | 3/2015 | Hyeon | |

FOREIGN PATENT DOCUMENTS

| | | |
|---|---|---|
| CN | 101167706 A | 4/2008 |
| WO | 0134939 A1 | 5/2001 |
| WO | 2011012164 A1 | 2/2011 |
| WO | 2014068390 A1 | 5/2014 |
| WO | 2014139037 A1 | 9/2014 |
| WO | 2014167056 A1 | 10/2014 |
| WO | 2015023648 A1 | 2/2015 |

OTHER PUBLICATIONS

Ahuja et al., "Optimal path selection for minimizing the differential delay in Ethernet-over-SONET", Computer Networks, 2006, pp. 2349-2363, vol. 50, No. 13, Elsevier.
International Search Report and Written Opinion for related PCT application PCT/US2016/026719 dated Jul. 18, 2016.
The International Search Report and Written Opinion for related PCT application PCT/US2017/013142 dated Mar. 17, 2017.
Couvreur et al., "Nanocapsule Technology: A Review", Critical Reviews in Therapeutic Drug Carrier Systems, 2002, pp. 99-134, vol. 19, No. 2, Begell House, Inc.
Gale et al., "Tertiary Surfactant Flooding: Petroleum Sulfonate Composition-Efficacy Studies", SPE-AIME Symposium on Improved Oil Recovery, 1972, pp. 191-199, American Institute of Mining Metallurgical and Petroleum Engineers Inc.
Machine Translation of CN101167706 dated Apr. 30, 2008; 11 Pages.
Waters, G. A., and D. D. DeLeon. "Encapsulated breakers in the Red Fork formation of the Anadarko basin: a case history." SPE Production Operations Symposium. Society of Petroleum Engineers, 1993. 567-573.
Wilk et al., "Loaded nanoparticles with cyanine-type photosensitizers: preparation, characterization and encapsulation", ResearchGate, 2009, pp. 1-7.
Xing et al., "Nanoencapsulation of Capsaicin by Complex Coacervation of Gelatin, Acacia, and Tannins", Journal of Applied Polymer Science, 2005, pp. 2225-2229, vol. 96, No. 6, Wiley Periodicals Inc.

* cited by examiner

*Primary Examiner* — Jeffrey D Washville
(74) *Attorney, Agent, or Firm* — Bracewell LLP; Constance G. Rhebergen; Kevin R. Tamm

(57) ABSTRACT

The present technology relates to compositions and related methods for stabilizing surfactants capable of increasing liquid hydrocarbon production from subterranean reservoirs. In some embodiments, the technology relates to the stabilization of sulfonate based surfactants for enhanced oil recovery ("EOR") operations. In certain embodiments, the sulfonate based surfactants are characterized by increased thermal and chemical stability under crude oil recovery conditions.

13 Claims, No Drawings

STABILIZATION OF PETROLEUM SURFACTANTS FOR ENHANCING OIL RECOVERY

PRIORITY CLAIM

The present application is a divisional application of and claims priority to and the benefit of non-provisional U.S. patent application Ser. No. 14/994,507, filed Jan. 13, 2016, the entire disclosure of which is incorporated by reference here.

FIELD OF THE TECHNOLOGY

The present technology relates to compositions and related methods for stabilizing surfactants capable of increasing liquid hydrocarbon production from subterranean reservoirs. In some embodiments, the technology relates to sulfonate based surfactants for enhanced oil recovery ("EOR") operations.

BACKGROUND OF THE TECHNOLOGY

The safe and economical production of commercially valuable hydrocarbons, such as, for example, crude oil, is critical for the well-being of the global energy and chemical markets. Processes for increasing crude oil yields and enhancing oil recovery, including the use of compounds and related methods, are of great importance to the oil and gas industry. A chemical class of particular importance in liquid hydrocarbon recovery is surfactants. Surfactants may be utilized in liquid hydrocarbon recovery processes due to their ability to reduce the surface tension between liquid-liquid and solid-liquid interfaces, such as crude oil in a subterranean reservoir. These compounds may be cationic, anionic, both (zwitterionic) or non-ionic and subsequently may have a wide range of organic counterions in addition to or alternative to inorganic counterions in addition to or alternative to metallic counterions.

Petroleum sulfonate is an anionic surfactant that may be used in liquid hydrocarbon extraction techniques such as enhanced oil recovery ("EOR"). Although it is inexpensive and beneficially soluble in fresh water, petroleum sulfonate can be largely insoluble or difficult to dissolve in high salinity aqueous solutions such as salt water, and often results in an insoluble agglomeration comprising the petroleum sulfonate composition. The global abundance of seawater and brine for use in EOR and other liquid hydrocarbon recovery processes could therefore benefit the energy and chemical industries through the development of improved petroleum sulfonate and related surfactant based compositions and methods of use capable of enhancing oil recovery processes.

SUMMARY OF THE TECHNOLOGY

The present technology provides for stabilized surfactant compositions and methods for increasing liquid hydrocarbon production in processes such as enhanced oil recovery. In some embodiments, the present technology relates to a method for enhancing oil recovery using a modified petroleum sulfonate solution comprising mixing a petroleum sulfonate solution with an alcohol alkoxylate and polyvinylpyrrolidone under ambient temperature and pressure; heating the resulting solution to a temperature of about 95° C. for a period of between 48 hours and 120 hours; mixing the heated solution with a saline water fraction characterized by a salt content of at least about 3.5% by weight; and introducing the resulting solution in a subterranean crude oil reservoir under conditions capable of reducing surface tension of the crude oil fraction in the reservoir.

In some embodiments, the alcohol alkoxylate is selected from the group consisting of alcohol ethoxylate and alcohol ethoxysulfate. In further embodiments, the petroleum sulfonate solution comprises petroleum sulfonate at a concentration of about 5% by weight. In still further embodiments, the petroleum sulfonate solution further comprises at least one metal selected from the group consisting of sodium, calcium, and barium. In additional embodiments, the petroleum sulfonate solution and the saline water fraction are combined in a ratio of about 1:10. In some embodiments, alcohol alkoxylate and polyvinylpyrrolidone are combined in a ratio of about 1:1. In further embodiments, the modified petroleum sulfonate solution is stable under subterranean reservoir conditions for a period of about 50 days. In still further embodiments, the modified petroleum sulfonate solution is characterized by particles in a size range of between about 10 nanometers ("nm") and about 20 nm.

In some embodiments, the present technology relates to a modified petroleum sulfonate composition comprising petroleum sulfonate; alcohol ethoxylate; polyvinylpyrrolidone; and saline water. In certain embodiments, the petroleum sulfonate solution comprises petroleum sulfonate at a concentration of about 5% by weight. In further embodiments, the petroleum sulfonate solution further comprises at least one metal selected from the group consisting of sodium, calcium, barium, and other cations. In still further embodiments, the petroleum sulfonate solution and the saline water fraction are combined in a ratio of about 1:10. In additional embodiments, the alcohol alkoxylate and polyvinylpyrrolidone are combined in a ratio of about 1:1. In some embodiments, the modified petroleum sulfonate solution is stable under subterranean reservoir conditions for a period of about 50 days. In certain embodiments, the modified petroleum sulfonate solution is characterized by particles in a size range of between about 10 nm and about 20 nm.

In some embodiments of the compositions and methods of the present disclosure, the alcohol alkoxylate comprises at least two carbon atoms in addition to two ethylene oxide moieties. In other embodiments, the alcohol alkoxylate comprises between about two and about 30 carbon atoms in addition to between about two and about 30 ethylene oxide moieties. In still other embodiments, the alcohol alkoxylate comprises between about six and about 12 carbon atoms in addition to between about two and about eight ethylene oxide moieties.

BRIEF DESCRIPTION OF THE DRAWINGS

No drawings.

DETAILED DESCRIPTION OF THE TECHNOLOGY

Although the following detailed description contains specific details for illustrative purposes, the skilled artisan will appreciate that many examples, variations and alterations to the following details are within the scope and spirit of the technology. Accordingly, the example embodiments of the technology are set forth without any loss of generality, and without undue limitations, on the claimed technology.

The term "surfactant" refers to a chemical capable of lowering the surface tension at a liquid-liquid interface in addition to or alternative to a solid-liquid interface. While in no way limiting the scope of the present technology, surfactants for use in the present technology may comprise anionic surfactants including sulfonate based surfactants such as petroleum sulfonate.

The terms "salt water," "seawater" and "saline water" refer to water from an ocean, sea, connate water from a hydrocarbon-bearing reservoir, or other body of salt water or fresh water modified to exhibit a profile characterized by a salinity concentration of about 3.5% by weight. In accordance with some embodiments of the present technology, a solution comprising salt water, seawater or "brine," which has a salinity concentration of between about 5% and about 26% by weight, may be combined with a surfactant such as petroleum sulfonate for increasing liquid hydrocarbon recovery.

As used throughout the disclosure, "solubilized" can refer to a process or a composition which is capable of turning an insoluble solid into a stable dispersion of particles in a solution, unless the context denotes otherwise.

The terms "alcohol alkoxylate(s)", "alkoxylate(s)" and "alkyl alcohol alkoxylate(s)" refer to a class of chemicals capable of performing alkoxylation reactions, including but not limited to ethoxylation reactions. Examples of alcohol alkoxylates for use in the present technology include alcohol ethoxylates and alcohol ethoxysulfates.

The present technology addresses problems associated with the recovery of liquid hydrocarbons such as crude oil, including heavy crude oil and extra heavy crude oil. In accordance with embodiments of the present technology, a composition capable of increasing liquid hydrocarbon recovery that comprises a modified petroleum sulfonate is disclosed.

In some embodiments, the present technology advantageously results in a solubilized anionic surfactant such as petroleum sulfonate capable of resisting thermal decomposition or agglomeration over an extended period of time. In certain embodiments, the compositions and related methodologies disclosed in the present application encompass a modified petroleum sulfonate capable of behaving as a surfactant under downhole conditions for at least about 10 days, about 20 days, about 25 days and about 50 days. In additional embodiments, the downhole conditions associated with the present technology involve temperatures of at least about 95° C., at least about 150° C., at least about 205° C., and at least about 260° C. In further embodiments, the downhole conditions associated with the present technology involve pressures of at least about 100 kilopascals ("kPa"), at least about 60 megapascals ("MPa"), at least about 135 MPa and at least about 240 MPa.

It may be appreciated by those skilled in the relevant arts that the stabilized petroleum sulfonate or related anionic surfactant(s) disclosed in the present application may be solubilized in both fresh water and salt water as opposed to strictly fresh water. In addition, anionic surfactants such as petroleum sulfonate often precipitate in salt containing aqueous solutions, with increasing salinity often linearly increasing the rate of precipitation or agglomeration of the surfactant. While in no way limiting the present technology to any particular theory, it is believed that the presence of ions exhibiting opposing charges, such as a cationic (positively charged) species in the presence of an anionic (negatively charged) surfactant, can induce the precipitation (agglomeration) of one or more surfactants present in a solution.

In certain embodiments, the problems associated with anionic surfactant precipitation such as the precipitation of petroleum sulfonate in salt water may be addressed through the incorporation of alcohol alkoxylate and polyvinylpyrrolidone into a solution comprising petroleum sulfonate. In some embodiments, a mixture of petroleum sulfonate:alcohol alkoxylate:polyvinylpyrrolidone is present in solution at a ratio of about 1:1:1. In some embodiments, a mixture of petroleum sulfonate:alcohol alkoxylate:polyvinylpyrrolidone is present in solution between ratios of about 1:0.1:0.1 to about 1:5:5. In further embodiments, the alcohol alkoxylate is alcohol ethoxylate. In additional embodiments, the mixture may comprise alcohol ethoxysulfate, either in addition to or as a substitute for alcohol ethoxylate. In still further embodiments, petroleum sulfonate may be present in solution at a concentration of at least 1% by weight, at least 3% by weight, at least 5% by weight, and at least 10% by weight.

Internal olefin sulfonates ("IOS") are a kind of sulfonate that has an internal sulfonate group. Petroleum sulfonates are generally not IOS. Petroleum sulfonates are generally linear alkyl benzene sulfonates. Sulfonates of either type are generally not stable in high salinity water. The present technology teaches that the combination of alcohol alkoxylates such as, for example, alcohol ethoxylate, and polyvinylpyrrolidone ("PVP") stabilize petroleum sulfonate in the presence of high salinity water. In some embodiments of the present disclosure, the compositions and methods do not produce IOS at all, and are carried out in the absence of IOS. In some embodiments, no chemical reaction occurs in combining petroleum sulfonate, alcohol alkoxylates and PVP; rather, a stabilization of a mixture occurs by interactions between molecules.

EXAMPLES

The following examples are included to demonstrate embodiments of the technology. It should be appreciated by those of skill in the art that the techniques and compositions disclosed in the examples which follow represent techniques and compositions discovered by the inventors to function well in the practice of the technology, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the technology.

Example 1. Combination of Unmodified Petroleum Sulfonate and Seawater

A 10 milliliter ("ml") solution of commercially available and unmodified 5% by weight petroleum sulfonate (PETRONATE® EOR2095; Chemtura Corporation, Philadelphia, Pa. USA) was mixed with 100 ml of seawater containing about 41 grams ("g") NaCl, 2.38 g $CaCl_2.2H_2O$, 17.6 g $MgCl_2.6H_2O$, 6.3 g $Na_2SO_4$ and 0.16 g $NaHCO_3$ per liter of seawater. The additives were mixed vigorously by an overhead marine propeller. Mixing was stopped and the mixture separated into two phases within 30 minutes. The upper phase was a yellow immiscible layer comprising petroleum sulfonate, and the lower phase comprised seawater that demonstrated the insoluble agglomerate produced by the combination of unmodified petroleum sulfonate with seawater.

Example 2A. Combination of Polyvinylpyrrolidone, Unmodified Petroleum Sulfonate and Seawater A 10 ml solution of commercially available and unmodified 5% by weight petroleum sulfonate (PETRONATE®

EOR2095; Chemtura Corporation, Philadelphia, Pa. USA) was mixed with 100 ml of seawater as described in Example 1 and further comprising about 0.6 g of polyvinylpyrrolidone ("PVP"; molecular weight ("MW")=55,000). The additives were mixed vigorously by an overhead marine propeller. Mixing was stopped and the mixture was placed in an oven at a temperature of about 95° C. After about five days of heating, the dispersion phase was observed to separate from the mixture demonstrating that the use of a water-soluble polymer such as PVP is insufficient for producing a petroleum sulfonate based dispersion in seawater.

Example 2B. Combination of Alcohol Ethoxylate, Unmodified Petroleum Sulfonate, and Seawater A 0.6 g portion of alcohol ethoxylate (MARLINAT® K23-6ESME90 obtained from Sasol of Johannesburg, South Africa) was added to a 10 ml solution of commercially available and unmodified 5% by weight petroleum sulfonate (PETRONATE® EOR2095 obtained from Chemtura Corporation of Philadelphia, Pa. USA). The structure of the alcohol ethoxylate was generally $C_{8-10}$ (Ethylene oxide) 6, or in other words, an R functional group of the alcohol ethoxylate had 8 to 10 carbons and 6 ethylene oxides were present between the R functional group and the alcohol functional group. The mixed alcohol ethoxylate and petroleum sulfonate was mixed with 100 ml of seawater containing about 41 g NaCl, 2.38 g $CaCl_2.2H_2O$, 17.6 g $MgCl_2.6H_2O$, 6.3 g $Na_2SO_4$ and 0.16 g $NaHCO_3$ per liter of seawater as described in Example 1. The additives were mixed vigorously by an overhead marine propeller. The resulting dispersion was then placed in an oven at a temperature of about 95° C. After about 10 days of heating, the dispersion phase was observed to separate from the mixture demonstrating that the use of an alcohol ethoxylate is insufficient for producing a petroleum sulfonate based dispersion in seawater.

Example 3

A 0.6 g portion of alcohol ethoxylate (MARLINAT® K23-6ESME90 obtained from Sasol of Johannesburg, South Africa) was added to a 10 ml solution of commercially available and unmodified 5% by weight petroleum sulfonate (PETRONATE® EOR2095 obtained from Chemtura Corporation of Philadelphia, Pa. USA). The mixture of alcohol ethoxylate and petroleum sulfonate was mixed with 100 ml of seawater containing about 41 g NaCl, 2.38 g $CaCl_2.2H_2O$, 17.6 g $MgCl_2.6H_2O$, 6.3 g $Na_2SO_4$ and 0.16 g $NaHCO_3$ per liter of seawater as described in Example 1 and further comprising about 0.6 grams of polyvinylpyrrolidone (MW=55,000). The additives were mixed vigorously by an overhead marine propeller. The resulting dispersion was then placed in an oven at a temperature of about 95° C. There was no phase separation observed in the mixture during the time periods (up to 50 days) as exemplified in Table 1, where "N/A" denotes the formation of a cloudy dispersion. While in no way limiting the technology to any particular theory, the formation of the cloudy dispersion may result from an agglomeration of the petroleum sulfonate, the alcohol ethoxylate or a combination thereof.

TABLE 1

Average observed particle size (in nanometers ("nm")) for agglomerated particles produced in accordance with the experimental conditions of Example 3.

| Days | Particle Size (nm) |
|---|---|
| 0 | 15 |
| 2 through 28 | N/A |
| 29 through 50 | 17 |

Example 4

In a first trial, about 0.4 g of alcohol ethoxylate (MARLINAT® K23-6ESME90 obtained from Sasol of Johannesburg, South Africa) was added to a 10 ml solution of commercially available and unmodified 5% by weight petroleum sulfonate (PETRONATE® EOR2095 obtained from Chemtura Corporation of Philadelphia, Pa. USA). The mixture of alcohol ethoxylate and petroleum sulfonate was mixed with 100 ml of seawater containing about 41 g NaCl, 2.38 g $CaCl_2.2H_2O$, 17.6 g $MgCl_2.6H_2O$, 6.3 g $Na_2SO_4$ and 0.16 g $NaHCO_3$ per liter of seawater as described in Example 1 and further comprising about 0.6 grams of polyvinylpyrrolidone (PVP; MW=55,000). The additives were mixed vigorously by an overhead marine propeller. The resulting dispersion was then placed in an oven at a temperature of about 95° C. There was no phase separation observed in the mixture during the time periods (up to 37 days) as exemplified in Table 2, where "N/A" denotes the formation of a cloudy dispersion.

TABLE 2

Average observed particle size (in nm) for agglomerated particles produced in accordance with the experimental conditions of the first trial in Example 4.

| Days | Particle Size (nm) |
|---|---|
| 0 | 17 |
| 2 through 10 | N/A |
| 11 through 37 | 13 |

A second trial was carried out as described previously in Example 4, trial 1, with the amount of alcohol ethoxylate decreased to about 0.3 g. The results are shown in Table 3. No phase separation was observed at extended periods of time.

TABLE 3

Average observed particle size (in nm) for agglomerated particles produced in accordance with the experimental conditions of the second trial in Example 4.

| Days | Particle Size (nm) |
|---|---|
| 0 | 15 |
| 2 through 10 | N/A |
| 11 through 41 | 11 |

A third trial was carried out as described previously in Example 4, trial 1, with the amount of alcohol ethoxylate further decreased to about 0.16 g. The results are shown in Table 4. No observable cloud point was detected in this example. While in no way limiting the present technology to any particular theory, the lack of observable cloud point may indicate that the cloud point for the alcohol ethoxylate solution disclosed in the present application is greater than room temperature (about 70° F. (21° C.)).

TABLE 4

Average observed particle size (in nm) for agglomerated particles produced in accordance with the experimental conditions of the third trial in Example 4.

| Days | Particle Size (nm) |
|---|---|
| 0 | 15 |
| 2 through 44 | 14 |

Although the present technology has been described in detail, it should be understood that various changes, substitutions, and alterations can be made hereupon without departing from the principle and scope of the technology. Accordingly, the scope of the present technology should be determined by the following claims and their appropriate legal equivalents.

The singular forms "a", "an" and "the" include plural references, unless the context clearly dictates otherwise.

"Optional" or "optionally" means that the subsequently described component may or may not be present or the event or circumstances may or may not occur. The description includes instances where the component is present and instances where it is not present, and instances where the event or circumstance occurs and instances where it does not occur.

Ranges may be expressed as from about one particular value or to about another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the technology pertains, except when these references contradict the statements made in the present application.

What is claimed is:

1. A modified petroleum sulfonate composition comprising:
    a petroleum sulfonate solution, where the petroleum sulfonate solution comprises linear alkyl benzene sulfonates and does not include internal olefin sulfonates;
    alcohol alkoxylate;
    polyvinylpyrrolidone, the polyvinylpyrrolidone having molecular weight of about 55,000, where the alcohol alkoxylate and polyvinylpyrrolidone are combined in a weight ratio of between about 1:1 to about 1:3.75; and
    a saline water fraction, where the modified petroleum sulfonate solution is stable under subterranean reservoir conditions for a period of at least about 37 days.

2. The composition of claim 1, where the petroleum sulfonate solution comprises petroleum sulfonate at a concentration of about 5% by weight.

3. The composition of claim 1, where the petroleum sulfonate solution further comprises at least one metal selected from the group consisting of sodium, calcium, and barium.

4. The composition of claim 1, where the petroleum sulfonate solution and the saline water fraction are combined in a ratio of about 1:10.

5. The composition of claim 1, where the alcohol alkoxylate and polyvinylpyrrolidone are combined in a ratio of about 1:1.

6. The composition of claim 1, where the modified petroleum sulfonate composition is stable under subterranean reservoir conditions for a period of about 50 days.

7. The composition of claim 1, where the modified petroleum sulfonate composition is characterized by particles in a size range of between about 10 nm and about 20 nm.

8. The composition of claim 1, where the alcohol alkoxylate comprises at least two carbon atoms in addition to two ethylene oxide moieties.

9. The composition of claim 1, where the alcohol alkoxylate comprises between about two and about 30 carbon atoms in addition to between about two and about 30 ethylene oxide moieties.

10. The composition of claim 1, where the alcohol alkoxylate comprises between about six and about 12 carbon atoms in addition to between about two and about eight ethylene oxide moieties.

11. The composition of claim 1, where the alcohol alkoxylate is selected from the group consisting of alcohol ethoxylate and alcohol ethoxysulfate.

12. The composition of claim 1, where the saline water fraction comprises sea water.

13. The composition of claim 12, where the sea water has a salinity concentration of between about 5% and about 26% by weight.

* * * * *